United States Patent [19]
Pfleger et al.

[11] Patent Number: 5,572,981
[45] Date of Patent: Nov. 12, 1996

[54] METHOD FOR MONITORING THE FUNCTIONAL CAPABILITY OF A TANK VENTING SYSTEM FOR A MOTOR VEHICLE

[75] Inventors: Hartmut Pfleger, Braunschweig; Manfred Wier, Wenzenbach; Klaus Bayerle, Regensburg, all of Germany

[73] Assignee: Siemens Aktiengesellschaft, Munich, Germany

[21] Appl. No.: 510,744

[22] Filed: Aug. 3, 1995

[30] Foreign Application Priority Data

Aug. 4, 1994 [DE] Germany .......................... 44 27 688.5

[51] Int. Cl.⁶ .......................... B60K 15/03; G01M 15/00; F02D 41/14
[52] U.S. Cl. .......................... 123/698; 123/520
[58] Field of Search .......................... 123/690, 698, 123/519, 520

[56] References Cited

U.S. PATENT DOCUMENTS

| | | | |
|---|---|---|---|
| 5,193,512 | 3/1993 | Steinbrenner et al. | 123/520 |
| 5,195,498 | 3/1993 | Siebler et al. | 123/698 |
| 5,339,788 | 8/1994 | Blumenstock et al. | 123/520 |
| 5,347,971 | 9/1994 | Kobayashi et al. | 123/520 |
| 5,353,771 | 10/1994 | Blumenstock et al. | 123/520 |
| 5,355,863 | 10/1994 | Yamanaka et al. | 123/520 |
| 5,445,015 | 8/1995 | Namiki et al. | 123/520 |
| 5,463,998 | 11/1995 | Denz et al. | 123/520 |
| 5,490,414 | 2/1996 | Durschmidt et al. | 123/520 |

FOREIGN PATENT DOCUMENTS

| | | |
|---|---|---|
| 3909887 | 9/1990 | Germany . |
| 4132055 | 4/1993 | Germany . |

*Primary Examiner*—Willis R. Wolfe
*Attorney, Agent, or Firm*—Herbert L. Lerner; Laurence A. Greenberg

[57] ABSTRACT

A method for monitoring functional capability of a tank venting system for a motor vehicle, includes evacuation of the tank venting system through the use of negative pressure or vacuum prevailing in the suction tube of an internal combustion engine and assessing the system based on negative pressure buildup and negative pressure letup gradients. Additionally, besides other abnormal termination criteria, the dynamics of pressure changes are also monitored and the method is immediately discontinued, if pressure fluctuations are ascertained which exceed a predetermined measure.

14 Claims, 6 Drawing Sheets

METHOD FOR MONITORING THE FUNCTIONAL CAPABILITY OF A TANK VENTING SYSTEM FOR A MOTOR VEHICLE

BACKGROUND OF THE INVENTION

FIELD OF THE INVENTION

The invention relates to a method for monitoring the functional capability of a tank venting system that traps fuel fumes and leads to an internal combustion engine for a motor vehicle, on the basis of a negative pressure generated in the tank venting system, including a container adsorbing fuel fumes and communicating with a fuel tank through a venting line and with an intake tube of the engine through a regeneration line; an aeration line communicating with the atmosphere and being closable by a shutoff valve for monitoring the tank venting system; a pressure sensor detecting the system pressure of the tank venting system; a tank venting valve being disposed in the regeneration line, being opened to supply the fuel fumes stored in the container and building up a negative pressure in the tank venting system; wherein the tank venting system is classified as currently nonfunctional if the pressure gradient upon buildup of the negative pressure (negative pressure buildup testing) is below a threshold or the pressure gradient upon letup of the negative pressure (negative pressure letup testing) is above a further threshold; and additionally operating variables of the vehicle including of the engine and the tank venting system are monitored, and the method is discontinued if predetermined operating variable values at which a reliable statement about the functional capability is possible, are not attained.

One such monitoring method and an apparatus therefor are known from German Published, Non-Prosecuted Application DE 41 32 055 A1, corresponding to U.S. Pat. No. 5,398,661.

That disclosure describes a tank venting system which has a tank with a tank pressure sensor, an adsorption filter which communicates with the tank through a tank connection line, and an aeration line closable by a shutoff valve, and a tank venting valve that communicates with the adsorption filter through a valve line. A tank venting system which is constructed in that way is checked for functional capability by the following method:

—monitoring of vehicle operating variables, including the engine and the tank venting system, and discontinuation of the test if predetermined operating variables at which a reliable statement on the functional capability is possible, are not attained;

—closure of the shutoff valve;

—opening of the tank venting valve;

—measurement of the negative pressure building up in the tank;

—monitoring of vehicle operating variables that first become measurable during the test procedure, including the engine and the tank venting system, and discontinuation of the negative pressure buildup test if the operating variables indicate that the measured tank pressure values do not allow a reliable statement to be made about the functional capability of the system;

—finding the system to be currently nonfunctional, and termination of the method, if the negative pressure buildup gradient is below a threshold;

—closing the tank venting valve;

—measuring the negative pressure letting up in the tank;

—monitoring vehicle operating variables that are first measurable during the test procedure, including the motor and the tank venting system, and discontinuation of the negative pressure letup testing if the operating variables indicate that the measured tank pressure values do not allow a reliable statement about the functional capability of the system;

—finding the system to be currently nonfunctional, if the negative pressure letup gradient is above a threshold, and otherwise finding the system to be currently functional; and —opening the shutoff valve and terminating the method.

SUMMARY OF THE INVENTION

It is accordingly an object of the invention to provide a method for monitoring the functional capability of a tank venting system for a motor vehicle, which overcomes the hereinafore-mentioned disadvantages of the heretofore-known methods of this general type, which further improves previously known and proposed methods and which in particular refines criteria for discontinuation, in which the method is discontinued if an unequivocal statement cannot be made about the functionality of the tank venting system.

The method is also intended to be able to detect very small leaks in the tank venting system on the order of magnitude of 1 mm.

With the foregoing and other objects in view there is provided, in accordance with the invention, in a method for monitoring functional capability of a tank venting system trapping fuel fumes and leading to an internal combustion engine for a motor vehicle, on the basis of a negative pressure generated in the tank venting system, including a fuel tank, a container adsorbing fuel fumes, a venting line through which the container communicates with the fuel tank, an intake tube of the engine, and a regeneration line through which the container communicates with the intake tube; an aeration line communicating with the atmosphere, and a shutoff valve for closing the aeration line to monitor the tank venting system; a pressure sensor detecting a system pressure of the tank venting system; and a tank venting valve being disposed in the regeneration line, being opened for supplying fuel fumes stored in the container and for building up a negative pressure in the tank venting system; the method which comprises classifying the tank venting system as currently nonfunctional if a pressure gradient upon buildup of the negative pressure is below a threshold or a pressure gradient upon letup of the negative pressure is above a further threshold; monitoring operating variables of the vehicle including the engine and the tank venting system, and discontinuing the method if predetermined operating variable values at which a reliable statement about the functional capability is possible, are not attained; and monitoring the dynamic behavior of the pressure course in the tank venting system during the entire performance of the method; by detecting chronologically successive pressure values; forming a mean value of two of the pressure values; and discontinuing the method if an amount of a difference between the mean value and a current pressure value is outside a predetermined dynamic range.

In accordance with another mode of the invention, there is provided a method which comprises defining different dynamic ranges for testing the pressure buildup and testing the pressure letup.

In accordance with a further mode of the invention, there is provided a method which comprises defining the dynamic range to be small in the pressure letup testing, as compared with the dynamic range for the pressure buildup testing.

In accordance with an added mode of the invention, there is provided a method which comprises ascertaining a proportion of volatile fuel in the container as the operating variable; opening the tank venting valve and the shutoff valve for a time being dependent on the ascertained degree of loading of the container in order to carry out a scavenging operation on the container; detecting values occurring for minimal and maximal pressure in the tank venting system, after the end of the scavenging operation, during a predetermined period of time; and discontinuing the method if a difference between the values is below a limit value.

In accordance with an additional mode of the invention, there is provided a method which comprises closing the tank venting valve and the shutoff valve; detecting a starting pressure and detecting a final pressure after a predeterminable period of time has elapsed; forming a difference between the two values and comparing the difference with a first threshold value; discontinuing the method due to excessive outgassing of fuel if the difference is above the first threshold value; and otherwise utilizing the value as a correction factor for evaluating the pressure in the negative pressure letup testing.

In accordance with yet another mode of the invention, there is provided a method which comprises whenever the difference is below the first threshold value: comparing the difference with a limit value; discontinuing the method and recognizing an incompletely closed tank venting valve if the difference is below the limit value; and otherwise utilizing the final pressure as a starting value for the negative pressure buildup testing.

In accordance with yet a further mode of the invention, there is provided a method which comprises opening the tank venting valve in increments, to generate the negative pressure in the tank venting system, with the shutoff valve closed.

In accordance with yet an added mode of the invention, there is provided a method which comprises opening the tank venting valve through a ramp function of a predeterminable pitch.

In accordance with yet an additional mode of the invention, there is provided a method which comprises opening the tank venting valve for a predeterminable period of time; checking as to whether within the predeterminable period of time the pressure in the tank venting system beginning at the starting value has reached a diagnostic negative pressure value, and if that condition is met without a violation of a lambda controller threshold of a lambda controller of the engine having occurred during the predeterminable period of time; suddenly closing the tank venting valve; and detecting and utilizing the instantaneous pressure value as the starting value for the negative pressure letup testing.

In accordance with again another mode of the invention, there is provided a method which comprises closing the tank venting valve in increments if the lambda controller threshold is violated, to prevent a sudden leaning down of the mixture supplied to the engine; and discontinuing the method.

In accordance with again a further mode of the invention, there is provided a method which comprises, whenever within the predeterminable period of time the diagnostic negative pressure has not been attained, nor has any violation of the lambda controller threshold of the lambda controller taken place: detecting the pressure in the tank venting system after the predeterminable period of time elapses; then checking if the pressure beginning at the starting pressure has dropped by a minimum value being decisive for the extent of leakage in the tank venting system; drawing a conclusion as to a middle-sized leak in the tank venting system if the pressure has dropped by the minimum value; and otherwise drawing a conclusion that there is a very large leak, a tank venting valve is sticking in the closed state, an activated charcoal filter container shutoff valve is sticking in the open state, or a gas cap is missing, and entering the type of ascertained error in an error memory of an electronic control unit for the engine.

In accordance with again an added mode of the invention, there is provided a method which comprises detecting the pressure in the tank venting system and storing the pressure in the tank venting system in memory as a final pressure of the negative pressure letup testing, with the tank venting valve closed, beginning at the starting value for the negative pressure letup testing, after a time period has elapsed; forming a difference between the final pressure and the starting pressure; weighting the difference with a correction factor, for taking slight outgassing of fuel into account in the evaluation of the functional capability of the tank venting system; comparing the corrected difference with a threshold value; classifying the tank venting system as currently functional if the threshold value is not attained; and otherwise drawing a conclusion that there is a very small leak in the tank venting system.

In accordance with a concomitant mode of the invention, there is provided a method which comprises informing a driver of the vehicle at least one of acoustically and visually of at least one of an ascertained error and a type of error.

Other features which are considered as characteristic for the invention are set forth in the appended claims.

Although the invention is illustrated and described herein as embodied in a method for monitoring the functional capability of a tank venting system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
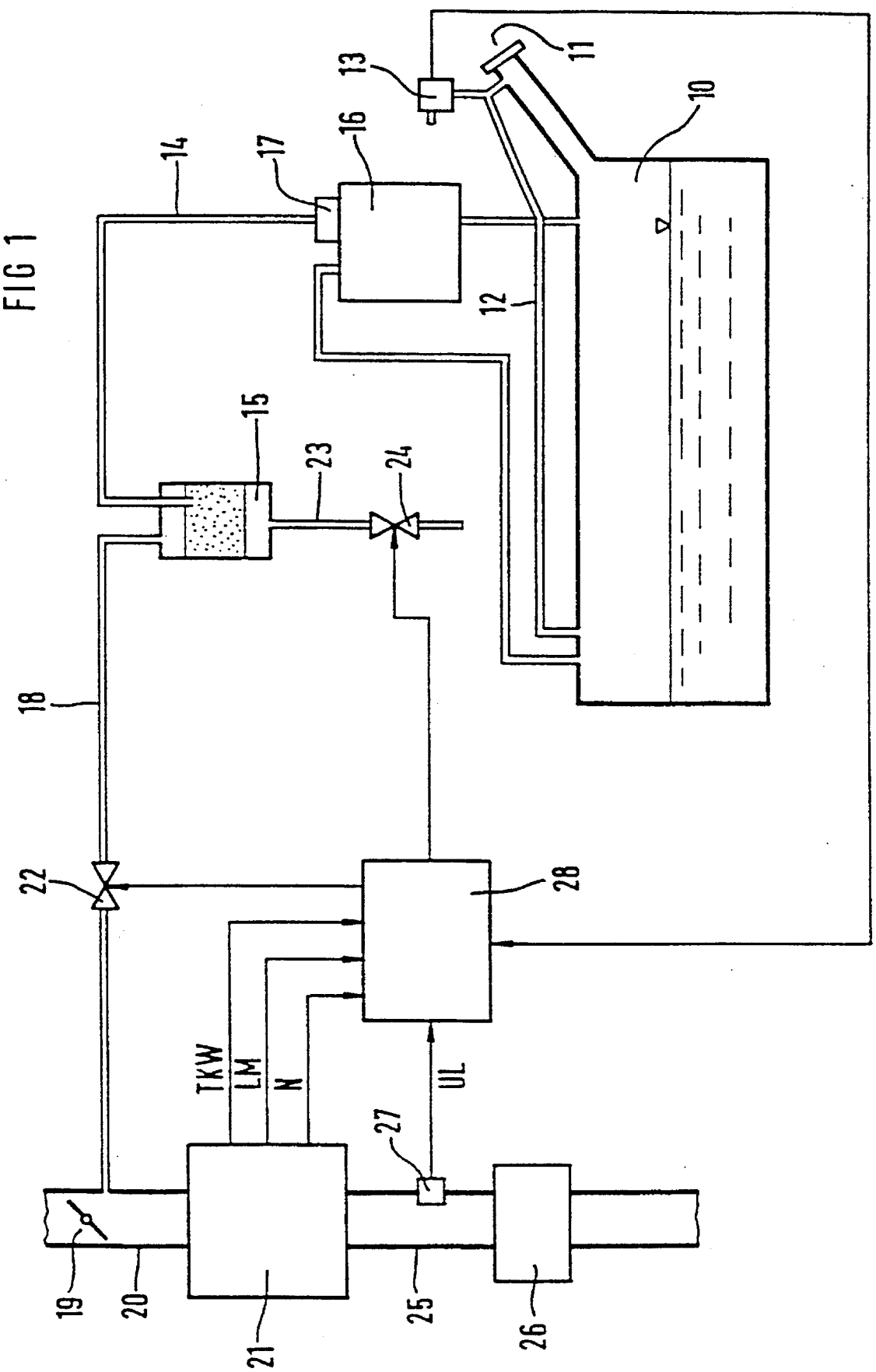
FIG. 1 is a schematic and block circuit diagram of an internal combustion engine with a tank venting system and an electronic control unit for monitoring the functional capability of the tank venting system.

Referring now to the figures of the drawing in detail and first, particularly, to FIG. 1 thereof, there is seen a simplified illustration of a tank venting system for a motor vehicle, that has a fuel tank 10 with a fill neck, which is not identified by a reference numeral but can be hermetically sealed with a gas cap 11. Branching off from the fill neck in the vicinity of a filling opening thereof is a vent line 12 for use when the tank is being filled. The vent line 12 opens out into the fuel tank 10 again at a point located farther away from the filling neck. Fuel fumes, i.e. vapor that develops in the process of filling the tank 10, can flow back again upward in this venting line 12 for use while the tank is filling, so that the fuel tank can be completely filled with fuel.

This line 12 also communicates with a first terminal of a differential pressure sensor 13, while a second terminal of the sensor 13 communicates with the atmosphere. However, in the case of the method for monitoring the functional capability of the tank venting system according to the invention, it is not important for the differential pressure sensor 13 to be placed at the location shown in FIG. 1. On the contrary, the sensor 13 may be disposed at any arbitrary point within the tank venting system.

The fuel tank 10 communicates through a vent line 14 with an activated charcoal filter container 15, in which hydrocarbon vapors outgassing from the fuel tank 10 are adsorbed. An equalization container 16 with an integrated tank protection valve assembly 17 is provided in the vent line 14, between the activated charcoal filter container 15 and the fuel tank 10. On one hand this assures that liquid fuel cannot directly reach the activated charcoal filter container 15, for instance if the fuel tank 10 is completely filled or if the vehicle comes to rest on its roof (rolls over) due to an accident. On the other hand, it assures that the complete tank venting system is protected from the occurrence of an excessively pronounced negative pressure or overpressure of malfunctioning components of the tank venting system, both during a scavenging operation and during the monitoring process.

A regeneration line 18 extends from the activated charcoal filter container 15 and opens downstream of a throttle valve 19 disposed in an intake conduit 20 of an internal combustion engine 21. A flow control valve 22, which is referred to below as a tank venting valve (TVV), is disposed in the regeneration line 18. An aeration line 23 is provided at the bottom of the activated charcoal filter container 15. The aeration line 23 communicates with the ambient air and can be shut off through the use of an electromagnetic activated charcoal filter shutoff valve (ASV), which is referred to below as a shutoff valve 24 for short.

A three-way catalyst 26 and an oxygen sensor in the form of a lambda sensor 27 disposed upstream of the catalyst 26, are provided in an exhaust conduit 25 of the engine 21. The sensor 27 outputs a signal UL to an electronic control unit 28 of the engine 21, in accordance with the proportion of oxygen in the exhaust gas. Other control parameters which are needed for operating the engine, such as the rpm N, the coolant temperature TCW, and the aspirated air mass AM are detected by suitable sensors and are also delivered to the control unit 28.

These parameters are then further processed, in such a way that the load state of the engine 21, among other factors, is determined, and if needed scavenging of the activated charcoal filter container 15 or a monitoring routine for the tank venting system can be initiated.

One such monitoring routine will be described below in broad steps, referring to the flowchart of FIG. 2. In the case of individual method steps S2.4 to S2.6, a description will follow below with reference to FIGS. 3–6.

The monitoring routine is enabled only if certain enable conditions are met. To that end, in a first step S2.0 a check is performed as to whether or not the engine is in the idling mode and the vehicle speed is equal to zero. Since speeds of v=0 can be detected only at relatively major effort and expense, vehicle speeds which while greater than 0 are still below a certain limit value (for instance 1.8 km/h) are used as the signal for v=0 and are therefore not a guarantee that the vehicle is at an absolute standstill. Moreover, the engine must have reached a minimum temperature, which is ascertained by comparing the currently measured coolant temperature with a predetermined limit value.

Monitoring of the tank venting system is carried out through the use of a negative test pressure, which is generated by opening the tank venting valve 22 in the engine idling state. The fuel tank 10 is evacuated through the activated charcoal filter container 15, with the aid of the relatively pronounced negative pressure in the intake tube during engine idling. If the activated charcoal filter container is saturated, it is possible for a rich mixture to be sent into the intake tube through the then-opened tank venting valve 22. The lambda integrator of the lambda control device is tuned very slowly in engine idling and cannot detect a sudden hydrocarbon production resulting from the rich mixture until relatively late, so that the danger exists that the engine will die. In order to avoid this, the degree of saturation of the activated charcoal ascertained during normal tank venting function, or in other words during the scavenging mode of the activated charcoal filter container, is taken into account.

If the enable conditions of step S2.0 are met, then through a mark A, a step S2.1 is reached, in which a load degree of the activated charcoal filter container 15, that is often referred to as the degree of saturation, is determined. Depending on the ascertained load degree, at partial load of the engine, variously long scavenging times of the activated charcoal filter container are initiated, before the monitoring of the tank venting system for tightness can be carried out. The scavenging time is longer if the loading degree is high than if the loading degree is low. This avoids a situation in which the activated charcoal has an overly high loading degree before monitoring begins, which would falsify the outcome of the monitoring.

In order to ascertain the loading degree of the activated charcoal filter container, the lambda regulating position is detected with the tank venting valve entirely or at least partially closed. Ascertainment of this load is most accurate if the tank venting valve was fully closed at the onset of this ascertainment. However, for reasons of the necessary activated charcoal filter container scavenging rate, it is appropriate in some cases to close the tank venting valve only to the extent of a limit duty cycle. If the tank venting valve is not yet closed, or if this limit duty cycle is not attained, then the duty cycle DC of the trigger signal for the tank venting valve is decreased through a ramp function until such time as the requisite outset position is present.

The duty cycle DC of the trigger signal for adjusting the tank venting valve is formed during normal operation, that is during the tank venting function, from a pilot control value KF_DC and a correction value 0≧FAK_TE≧1, which are linked multiplicatively. The loading state of the activated charcoal filter container can be determined through purposeful variation of this correction value. For a certain length of time corresponding to a certain number of P jumps of the lambda controller, the tank venting valve remains closed, or as noted above remains minimally opened, and the lambda regulating position is detected. Since the lambda control constantly attempts to adjust the fuel-air mixture to the stoichiometric ratio (λ=1), and the equilibrium of this ratio is impeded by the opened tank venting valve as a function of the degree of loading of the activated charcoal filter container, the difference between the lambda control positions (which are also called lambda controller mean values) LAMMV_DIFF_TE before and after triggering of the tank venting valve is a measure of the loading of the activated charcoal filter container.

Depending on the value of this difference LAMMV_DIFF_TE, variously long scavenging times are initiated.

If the requisite scavenging time has elapsed, then through a mark C a step S2.3 is attained, in which an examination is performed as to whether or not pressure fluctuations in the fuel circulation and in particular in the fuel tank might falsify the monitoring of the tank venting system. Since splashing of the fuel in the tank can deleteriously effect the pressure measurements, a study is made as to whether or not within a certain period of time pressure fluctuations occur, and whether or not they are possibly within an allowable tolerance limit. To that end, during an adaptable time period with the aid of the differential pressure sensor 13, the pressure in the tank venting system is measured continuously, and the maximum and minimum pressures that occur are ascertained. If the difference between these two values is within a fixed measurement window, then a correct starting pressure for subsequent measurements can be obtained, and in a step S2.4 a test for hydrocarbon outgassing follows.

However, if the pressure fluctuations in the step S2.3 are too great, one test condition has not been met, and a new ascertainment of the pressure fluctuations is carried out. This is repeated until such time as the pressure difference is within the allowable measurement window.

Prior to the actual negative pressure testing, it is ascertained in the step S2.4 whether or not a negative pressure can be allowed to be produced in the fuel tank. Since fuel fumes, for example resulting from the effects of heat in the tank venting system, can represent a further source of problems in evaluating the functional capability of the system, the monitoring routine is terminated if outgassing is too severe, and a new ascertainment of the degree of loading with an ensuing scavenging process in accordance with steps S2.1 and S2.2 awaited. In the step S2.4, it is also learned from pressure measurements whether or not the tank venting valve 22 is sticking in the open or partly open state, and if so the diagnosis is discontinued and the method is restarted at the step S2.1.

If no fuel outgassing is occurring in the step S2.4, or if the quantity of outgassing fuel is below a predetermined limit value, then in a step S2.5 a negative pressure is generated in the tank venting system by opening the tank venting valve. If the pressure in the system then fails to drop by a certain value within a predetermined time, the monitoring is discontinued, and the method for this cycle is ended (at a mark G). The tank venting function is thereupon enabled (at a step S2.7). However, if the thresholds of the lambda integrator of the lambda controller fail to be observed within this period, then the method is recontinued at the step S2.1.

If not, through a mark F, a step S2.6 is reached in which a check is made as to whether or not the negative pressure built up in the tank venting system is letting up (negative pressure letup testing) in a predetermined way.

Depending on the outcome of this testing, the conclusion is drawn either that there is a leak in the tank venting system or that the system is intact.

In both cases, in the next step S2.7 the tank venting function is enabled and the monitoring method is ended.

In order to select out pressure values that could cause misdetections in the event of an erratic pressure course in the fuel tank, caused by slamming of a vehicle door or hard braking of a slowly rolling vehicle, the dynamic performance of the pressure course is monitored over the entire method cycle. The term "limited dynamics, pressure course" is introduced for that purpose. First, the mean value $P\_MV_i$ of the current pressure value $P_i$ is formed with the most recent pressure value $P_{i-1}$:

$$P\_MV_i = \frac{P_i + P_{i-1}}{2}$$

The limited dynamics are satisfied if the amount of the difference between the mean value $P\_MV_i$ and the current pressure value $P_i$ is below a predetermined value, which is referred to below as the dynamic window value $P\_DYW$:

$$|P\_MV_i - P_i| < P\_DYW.$$

Figure 2:
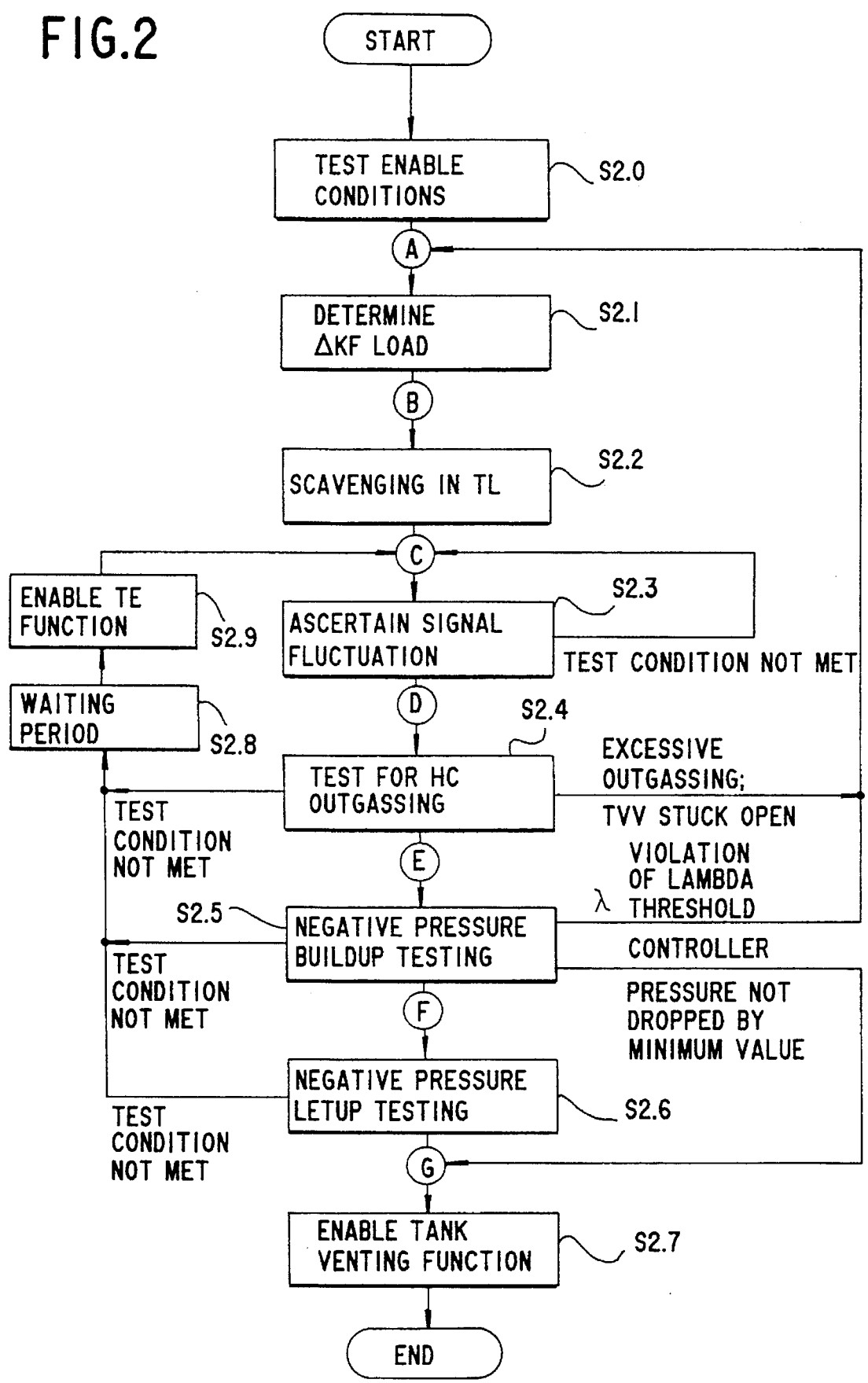
FIG. 2 is a flowchart showing one complete method cycle for monitoring the functional capability of the tank venting system.

In the case of the steps S2.4, S2.5 and S2.6 shown in FIG. 2, different dynamic window values can be defined. During the negative pressure letup testing (step S2.6) and the testing for hydrocarbon (HC) outgassing (step S2.4), the dynamic window value $P\_DYW$ is chosen to be low in proportion to the dynamic window values in testing of the negative pressure buildup (step S2.5). As a result, the accuracy of monitoring in the various method steps can be adjusted, and misdetections can be avoided in a purposeful way.

Moreover, it is also possible to define the dynamic window values as a function of the fill level of the fuel in the tank.

If the limited dynamics are violated while running through the various steps, then the monitoring is discontinued, and before a new monitoring is started, one must wait until the pressure conditions in the tank have stabilized. An applicable time (waiting time T_WAIT) is thus waited out in a step S2.8, and then in a step S2.9 the tank venting function is enabled, and the method is continued at a mark C.

However, the statement "test conditions not met" in steps S2.3–S2.6 in FIG. 2 does not mean only the discontinuation criterion "limited dynamics, pressure course", but also other discontinuation criteria. If during monitoring of the tank venting system, diagnostic errors in ascertaining the rpm or coolant temperature occur or if malfunctions of the components, that is the tank venting valve, the lambda controller, the throttle valve, the tank pressure sensor or the shutoff valve occur, then once again as in the case of the discontinuation, a transition to the waiting time state (step S2.9) is made through the limited dynamics. This happens if during an ongoing monitoring routine the engine leaves the idling state, or the speed of the vehicle exceeds a threshold value.

If the monitoring of the tank venting system is discontinued because the pressure rise in the test of fuel outgasses (step S2.4) is greater than a limit value, or if the lambda controller value changes by more than a predetermined value during the production of the negative pressure (negative pressure buildup testing, step S2.5), then before the next monitoring is carried out, a new load ascertainment (step S2.1) is awaited.

Figure 3:
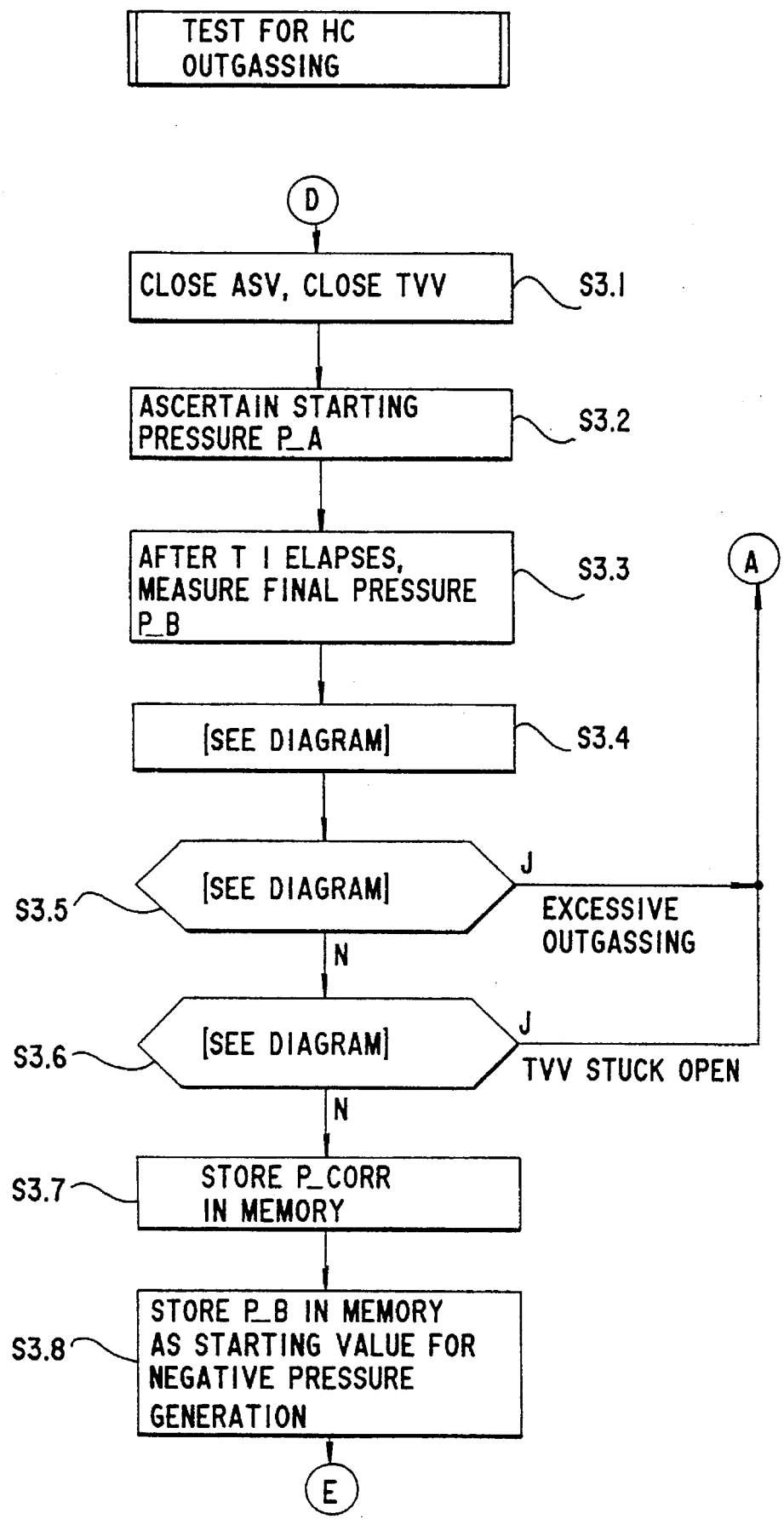
FIG. 3 is a more-detailed flowchart for FIG. 2, pertaining to a test for hydrocarbon outgassing.
Figure 4:
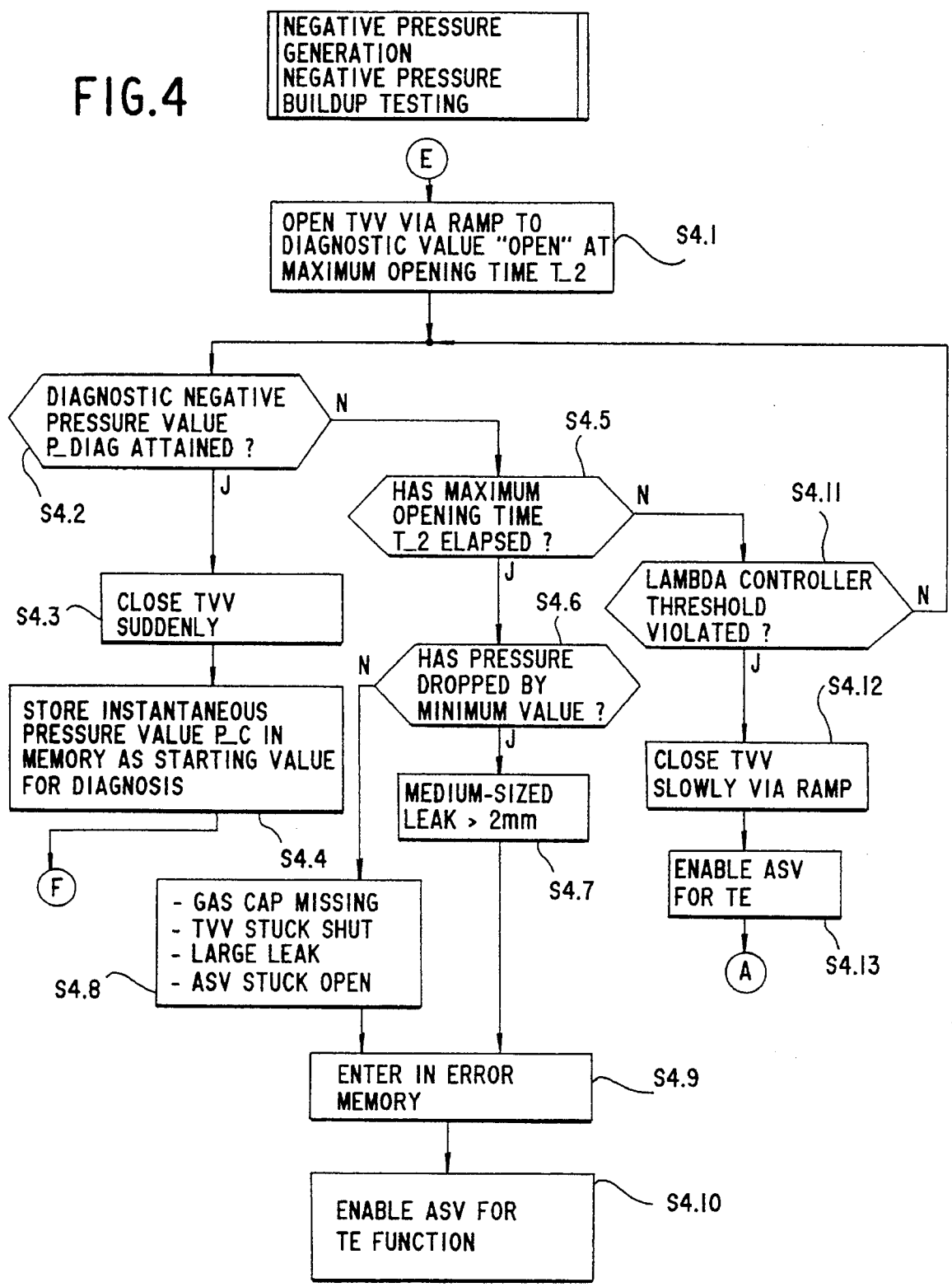
FIG. 4 is a more-detailed flowchart for FIG. 2, pertaining to a generation of negative pressure and testing of a negative pressure buildup.

The Step S2.4 includes substeps S3.1–S3.8 shown in FIG. 3. First, the shutoff valve 24 (ASV) and the tank venting system 22 (TVV) are simultaneously closed (step S3.1), and a starting pressure P_A is ascertained (step S3.2). After an adaptable time T_1 elapses, a pressure measurement is again carried out, and the outcome of this measurement is stored as a final pressure P_B in a working memory of the electronic control unit 28 (step S3.3). Next, in the step S3.4, a difference P_CORR between the final pressure P_B and the starting pressure P_A is ascertained:

$$P\_CORR=P\_B-P\_A.$$

If the value P_CORR is above a fixed threshold value P_THR 1 (interrogation in step S3.5), then the monitoring is discontinued, because excessive outgassing of the fuel is present, which represents a possible source of trouble in evaluating the outcomes of monitoring.

However, if the interrogation in the step S3.5 has a negative outcome, that is if the value P_CORR is below the threshold value P_THR 1, a checked is performed in a step S3.6 as to whether or not it is also below a further limit value P_TVV. If the pressure in the tank venting system during a time T_1 drops below the value P_TVV, then it can be concluded from this that the tank venting valve 22 cannot be completely closed but instead must be sticking in the open state or at least the partly open state, even though in the step S3.1, by triggering the tank venting valve 22 in the "closing" direction, the tank venting system should have been tightly sealed. The monitoring is discontinued analogously to when there is a positive response to the interrogation in the step 3.5, and a new load ascertainment is carried out in the step S2.1.

If the value for the pressure P_CORR is above the value P_TVV, which represents a tank venting valve that is sticking while open, then in steps S3.7 and S3.8 both the value P_CORR and the value for the final pressure P_B are stored in memory. The latter then serves in the ensuing negative pressure buildup testing (FIG. 4) as a starting value for the pressure measurements still to be carried out.

Instead of using individual values for the starting pressure P_A and the final pressure P_B, mean values from a certain number of pressure values (for instance four of them) for P_A, P_B may also be used.

Figure 6:
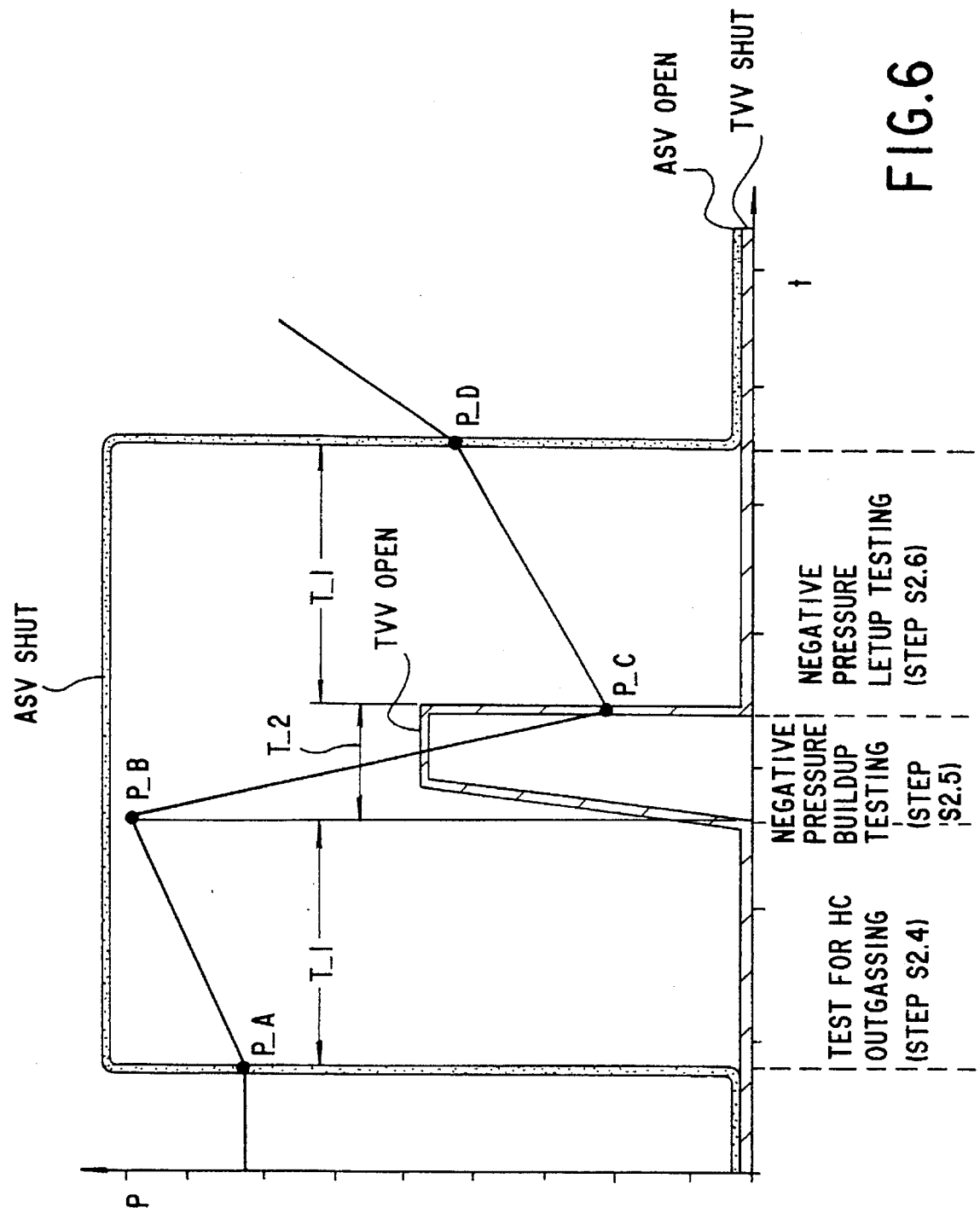
FIG. 6 is a diagram showing a course over time of pressure in the tank venting system during selected method steps.

In the diagram of FIG. 6, a solid line qualitatively indicates a course of pressure over time in the tank venting system during the steps S2.4–S2.6, and the pressure values P_A through P_B that occur at the beginning and the end of these steps are also shown. The times during which the tank venting valve and the shutoff valves are open and closed are also shown.

If in the step S2.4 neither excessive outgassing of the fuel nor a tank venting valve sticking open were found, and moreover if all of the test conditions are met, then through a mark E a step S4.1 (FIG. 4) is reached. While the shutoff valve 24 remains closed, the tank venting valve 22 is triggered with the aid of the electronic control unit 28 in such a way that the flow cross section of the regeneration line 18 is increased continuously up to a predeterminable diagnostic value. The incremental enlargement of the flow cross section is accomplished, for instance, by triggering the tank venting valve 22 through the use of a ramp function. This prevents a possible hydrocarbon surge from the activated charcoal filter container from being delivered too suddenly, through the open tank venting valve 22, to the combustion process of the engine, which could cause the engine to die or briefly worsen engine emissions.

Figure 5:
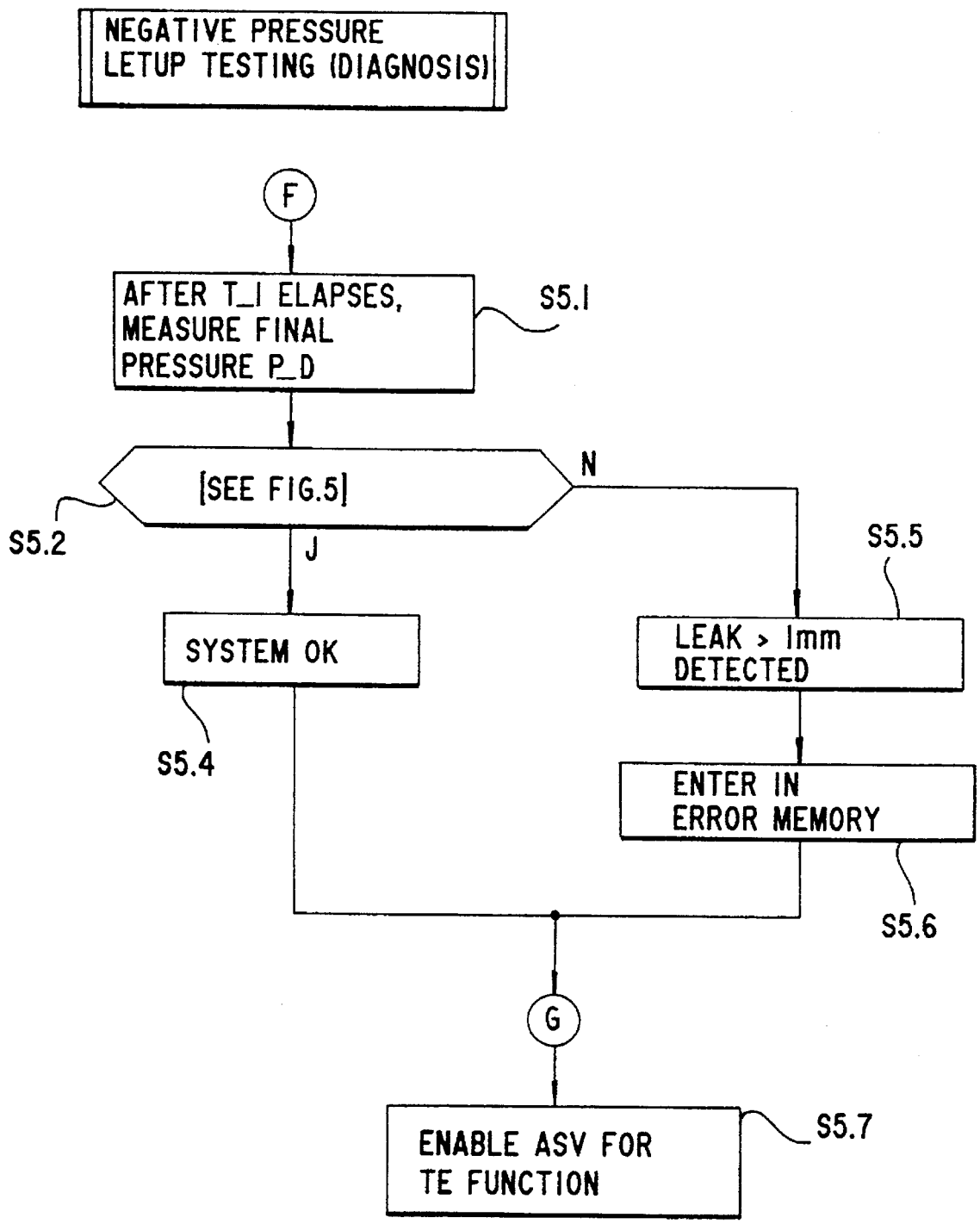
FIG. 5 is a more-detailed flowchart for FIG. 2, pertaining to a testing (diagnosis) of negative pressure letup.

The negative pressure prevailing in the intake tube is propagated through the open tank venting valve within the entire tank venting system up to the fuel tank. If the pressure beginning at the starting pressure P_B drops far enough, within an opening time T_2 of the tank venting valve, that a predetermined diagnostic negative pressure value P_DIAG is reached, then in a step S4.3 the tank venting valve 22 is closed abruptly, and an instantaneous pressure value P_C then prevailing is stored in memory (step S4.4) as a starting value for a subsequent diagnosis (FIG. 5). The method is then continued through the mark F with the step S2.6 (FIG. 2).

If the interrogations in the steps S4.2 and S4.5 find that the predetermined diagnostic pressure P_DIAG was not attained even though the time T_2 has already elapsed, then evidently it is not possible for negative pressure adequate for monitoring to be built up in the tank venting system. In order to enable at least roughly estimating the cause of this, a checked is performed in a step S4.6 as to whether or not the pressure drop attained is greater than or less than a minimum pressure value. The minimum pressure value is chosen in such a way that when this value is reached, in a step S4.7, a conclusion is drawn as to a medium-sized leak (for instance>2 mm), and otherwise in a step S4.8 that there is a large leak, a missing gas cap on the fuel tank, or a tank venting valve that is sticking in the closed state. In both cases, an entry is made in an error memory of the electronic control unit (step S4.9). In addition, the outcome can be reported acoustically and/or visually to the driver of the vehicle. Next, in a step S4.10, the shutoff valve 24 is opened again and the tank venting function is enabled. Since it was not possible to generate a negative pressure necessary for monitoring the tank venting system, the routine is thus ended.

If the thresholds of the lambda integrator of the lambda controller are violated during the opening duration T_2 of the tank venting valve (step S4.11), or in other words if the lambda controller value varies during the negative pressure buildup testing (extraction by suction) by more than a predetermined value since the beginning of the extraction by suction, then the monitoring is discontinued, and the tank venting valve is slowly reclosed in increments (step S4.12).

If the tank venting valve were to be closed without any limitation on the variation of the various values, for instance abruptly, then there would be the danger that the fuel-air mixture would suddenly lean down and the engine would die.

Next, the shutoff valve is opened and the tank venting function is enabled (step S4.13). Through the mark A, the step S2.1 is again reached, and there is a wait for a new ascertainment of the degree of loading. Once the pressure has been ascertained (value P_C in step S4.4), a transition is made to the negative pressure letup testing state (diagnosis in FIG. 5). In this state, there is a wait until a predeterminable time (diagnosis time), such as T_1 has elapsed, and then a resultant final pressure P_D is measured (step S5.1) and stored in memory. Then in a step S5.2, the pressure difference P_D–P_C between the diagnostic starting pressure and the diagnostic final pressure is formed. This difference is also corrected with the pressure value P_CORR from the step S3.4 (FIG. 3), by subtracting that value from the difference P_D–P_C. Thus the pressure rise caused by weak outgassing of fuel is taken into account in the evaluation of the functional capability of the tank venting system.

With the aid of this value for the corrected pressure difference, the decision is then made as to whether there is a relatively small leak in the tank venting system, or not. If this value is below a predetermined threshold value P_THR 2, then the tank venting system is considered to be functioning properly. Otherwise a leak larger than 1 mm is found, and the outcome is entered in the error memory. Regardless of whether or not an error has occurred, through the mark G a step S5.7 is reached, in which the shutoff valve is opened, the monitoring for this engine operation is shut off, and the tank venting function is enabled.

In the purely qualitative representation of the pressure ratios during the various monitoring steps in FIG. 6, a simplification has been made that after the closure of the tank venting valve in the step S4.3, no trailing of the pressure takes place, or in other words no further drop in the pressure. A slight trailing of the pressure of this kind is determined by the storage capability of the lines, or in other words essentially by the geometry of the components of the tank venting system, and can be taken into account or in other words compensated for by inserting a dead time. After closure of the tank venting valve, there is a wait for this dead time before the diagnostic starting value P_C is ascertained and the diagnosis time T_1 is started.

We claim:

1. In a method for monitoring functional capability of a tank venting system trapping fuel fumes and leading to an internal combustion engine for a motor vehicle, on the basis of a negative pressure generated in the tank venting system, including:

a fuel tank, a container adsorbing fuel fumes, a venting line through which the container communicates with the fuel tank, an intake tube of the engine, and a regeneration line through which the container communicates with the intake tube;

an aeration line communicating with the atmosphere, and a shutoff valve for closing the aeration line to monitor the tank venting system;

a pressure sensor detecting a system pressure of the tank venting system; and a tank venting valve being disposed in the regeneration line, being opened for supplying fuel fumes stored in the container and for building up a negative pressure in the tank venting system;

the method which comprises:

classifying the tank venting system as currently nonfunctional if a pressure gradient upon buildup of the negative pressure is below a threshold or a pressure gradient upon letup of the negative pressure is above a further threshold;

monitoring operating variables of the vehicle including the engine and the tank venting system, and discontinuing the method if predetermined operating variable values at which a reliable statement about the functional capability is possible, are not attained; and monitoring the dynamic behavior of the pressure course in the tank venting system during the entire performance of the method; by:

detecting chronologically successive pressure values;

forming a mean value of two of the pressure values; and discontinuing the method if an amount of a difference between the mean value and a current pressure value is outside a predetermined dynamic range.

2. The method according to claim 1, which comprises defining different dynamic ranges for testing the pressure buildup and testing the pressure letup.

3. The method according to claim 2, which comprises defining the dynamic range to be small in the pressure letup testing, as compared with the dynamic range for the pressure buildup testing.

4. The method according to claim 1, which comprises:

ascertaining a proportion of volatile fuel in the container as the operating variable;

opening the tank venting valve and the shutoff valve for a time being dependent on the ascertained degree of loading of the container in order to carry out a scavenging operation on the container;

detecting values occurring for minimal and maximal pressure in the tank venting system, after the end of the scavenging operation, during a predetermined period of time; and discontinuing the method if a difference between the values is below a limit value.

5. The method according to claim 1, which comprises:

closing the tank venting valve and the shutoff valve;

detecting a starting pressure and detecting a final pressure after a predeterminable period of time has elapsed;

forming a difference between the two values and comparing the difference with a first threshold value;

discontinuing the method due to excessive outgassing of fuel if the difference is above the first threshold value; and otherwise utilizing the value as a correction factor for evaluating the pressure in the negative pressure letup testing.

6. The method according to claim 5, which comprises:

whenever the difference is below the first threshold value:

comparing the difference with a limit value;

discontinuing the method and recognizing an incompletely closed tank venting valve if the difference is below the limit value; and otherwise utilizing the final pressure as a starting value for the negative pressure buildup testing.

7. The method according to claim 1, which comprises opening the tank venting valve in increments, to generate the negative pressure in the tank venting system, with the shutoff valve closed.

8. The method according to claim 7, which comprises opening the tank venting valve through a ramp function of a predeterminable pitch.

9. The method according to claim 7, which comprises:

opening the tank venting valve for a predeterminable period of time;

checking as to whether within the predeterminable period of time the pressure in the tank venting system beginning at the starting value has reached a diagnostic negative pressure value, and if that condition is met without a violation of a lambda controller threshold of a lambda controller of the engine having occurred during the predeterminable period of time;

suddenly closing the tank venting valve; and detecting and utilizing the instantaneous pressure value as the starting value for the negative pressure letup testing.

10. The method according to claim 9, which comprises:

closing the tank venting valve in increments if the lambda controller threshold is violated, to prevent a sudden leaning down of the mixture supplied to the engine; and discontinuing the method.

11. The method according to claim 9, which comprises:

whenever within the predeterminable period of time the diagnostic negative pressure has not been attained, nor has any violation of the lambda controller threshold of the lambda controller taken place:

detecting the pressure in the tank venting system after the predeterminable period of time elapses;

then checking if the pressure beginning at the starting pressure has dropped by a minimum value being decisive for the extent of leakage in the tank venting system;

drawing a conclusion as to a middle-sized leak in the tank venting system if the pressure has dropped by the minimum value; and otherwise drawing a conclusion that there is a very large leak, a tank venting valve is sticking in the closed state, an activated charcoal filter container shutoff valve is sticking in the open state, or a gas cap is missing, and entering the type of ascertained error in an error memory of an electronic control unit for the engine.

12. The method according to claim 9, which comprises:

detecting the pressure in the tank venting system and storing the pressure in the tank venting system in memory as a final pressure of the negative pressure letup testing, with the tank venting valve closed, beginning at the starting value for the negative pressure letup testing, after a time period has elapsed;

forming a difference between the final pressure and the starting pressure;

weighting the difference with a correction factor, for taking slight outgassing of fuel into account in the evaluation of the functional capability of the tank venting system;

comparing the corrected difference with a threshold value;

classifying the tank venting system as currently functional if the threshold value is not attained; and otherwise drawing a conclusion that there is a very small leak in the tank venting system.

13. The method according to claim 11, which comprises informing a driver of the vehicle at least one of acoustically and visually of at least one of an ascertained error and a type of error.

14. The method according to claim 12, which comprises informing a driver of the vehicle at least one of acoustically and visually of at least one of an ascertained error and a type of error.

* * * * *